United States Patent
Hsu et al.

(10) Patent No.: US 6,910,083 B2
(45) Date of Patent: Jun. 21, 2005

(54) METHOD FOR DETECTING CHANNELS OF A HOST TO WHICH HARD DISK CONTROLLERS BELONG

(75) Inventors: Ching Hao Hsu, Hsinchu (TW); Yu Hsiang Hsieh, Kaohsiung (TW)

(73) Assignee: Promise Technology, Inc., Hsinchu (TW)

( * ) Notice: Subject to any disclaimer, the term of this patent is extended or adjusted under 35 U.S.C. 154(b) by 172 days.

(21) Appl. No.: 10/603,751

(22) Filed: Jun. 26, 2003

(65) Prior Publication Data

US 2004/0267975 A1 Dec. 30, 2004

(51) Int. Cl.[7] .......................... G06F 13/10; G06F 12/02
(52) U.S. Cl. ...................... 710/9; 710/3; 710/8; 710/74
(58) Field of Search .............................. 710/3, 4, 8–10, 710/72, 74; 711/111–114; 714/7, 42; 700/214, 215

(56) References Cited

U.S. PATENT DOCUMENTS

| | | | | |
|---|---|---|---|---|
| 5,581,787 A | * | 12/1996 | Saeki et al. ................. 710/9 |
| 5,909,591 A | * | 6/1999 | Brooke ........................ 710/9 |
| 6,708,230 B2 | * | 3/2004 | Shin ............................ 710/9 |
| 6,854,027 B2 | * | 2/2005 | Hsu et al. .................... 710/74 |
| 2001/0049800 A1 | * | 12/2001 | Suzuki et al. ................ 714/7 |
| 2004/0139241 A1 | * | 7/2004 | Shikada ....................... 710/3 |

* cited by examiner

*Primary Examiner*—Ilwoo Park
(74) *Attorney, Agent, or Firm*—Rosenberg, Klein & Lee

(57) ABSTRACT

A method for detecting channels of a host to which hard disk controllers belong is used to detect the connection relations between several channels of a host and several removable hard disk cases in the hard disk device. Each of the removable hard disk cases has a current sensor for detecting the current variation of the hard disk, transforming the variation into a voltage signal, and transmitting the voltage signal to a enclosure-controller. The enclosure-controller then converts the voltage signal into a flag. The host can read the flag via a serial bus to build the corresponding relation between the channel connected to the hard disk and the enclosure-controller. The effects of easy use and friendly operation can thus be accomplished.

4 Claims, 3 Drawing Sheets

METHOD FOR DETECTING CHANNELS OF A HOST TO WHICH HARD DISK CONTROLLERS BELONG

FIELD OF THE INVENTION

The present invention relates to a method for detecting channels of a host to which hard disk controllers belong and, more particularly, to a method, which compares current variation when a hard disk idles or operates to let a hard disk controller trigger a flag so as to build the corresponding relations between channels of a host and the hard disk controllers according to the flag.

BACKGROUND OF THE INVENTION

A removable hard disk case generally includes a hard disk, a fan, a detection circuit and a enclosure-control chip. The detection circuit is used to detect the temperature, the fan's rotation speed and the voltage. The enclosure-control chip is used to collect environmental parameters and transmit them back to a host controller. A removable hard disk case of the conventional ATA (also called IDE) interface is generally connected to the host controller via a parallel ATA (PATA) bus. Using the PATA as the transmission interface, the enclosure-control chip in the removable hard disk case can transmit environmental parameters back to the host controller. The host controller also controls the enclosure-control chip in the removable hard disk case and transmits data to the hard disk via the PATA. An LED lamp is also directly connected to the enclosure-control chip in the removable hard disk case to flash when the hard disk malfunctions or is active.

Nowadays, the ATA interface evolves from parallel bus to serial bus, wherein two pairs of 1.5 GHz cables are used to transmit data at a higher speed. However, because the speed is as high as 1.5 GHz, if other external components are connected, there will be a problem of signal attenuation. Therefore, the 1.5 GHz cable can hardly be connected externally to other enclosure-control chips, or even the 1.5 GHz cable can be connected externally to other enclosure-control chips, the cost will be high. Generally, a channel of a host is connected to the hard disk via the serial ATA (SATA). The host controller is additionally connected to the LED lamp and the enclosure-control chip. However, the corresponding relation between the channel of the host and the enclosure-control chip disappears. That is, the corresponding relation between the hard disk connected to the channel and the LED lamp disappears. This will derives the following problem. When one hard disk malfunctions, the user cannot determine the hard disk corresponding to the flashing lamp. For instance, if a host controller has four serial ATA channels and can connect four hard disks, each accompanying a enclosure-control chip. Each of the enclosure-control chips has its ID. The host controller is series connected with the four enclosure-control chips via I2C interface. When the host controller finds that the hard disk of channel 1 malfunctions, it needs to let the LED lamp corresponding to channel 1 flash to notify the user to replace the hard disk. However, because the corresponding between the channel of the host and the enclosure-control chip disappears, unless the software has the capability of detecting the corresponding between the channel of the host and the ID of the enclosure-control chip, one can only assume the external wiring is the same as in the program. For instance, the program fixes the ID of the enclosure-control chip connected with channel 1 to 1, when the system performs the setting, the user must connect the cable of channel 1 to the removable hard disk case with ID 1 manually. However, manual assignment of ID easily connects wrong enclosure-control chips, resulting in the problems of incorrect flashing light and incorrect removal of hard disk.

Accordingly, the present invention aims to propose a method for detecting channels of a host to which hard disk controllers belong so as to build the corresponding relations between the channels of the host and the hard disk controllers.

SUMMARY OF THE INVENTION

The primary object of the present invention is to provide a method for detecting channels of a host to which hard disk controllers belong, which compare the current variation when a hard disk idles or operates to build the corresponding relations between channels of the host and enclosure-controllers of several hard disks, thereby solving the problems of incorrect flashing light and incorrect removal of hard disk in the prior art due to ignorance of the relation between the channels and the enclosure-controllers.

Another object of the present invention is to provide a method for detecting channels of a host to which hard disk controllers belong, which abandon manual assignment of IDs of enclosure-controllers of hard disks in the prior art to accomplish the effects of easy use and friendly operation.

Yet another object of the present invention is to provide a method for detecting channels of a host to which hard disk controllers belong so as to have the advantage of a lower price.

To achieve the above objects, a method for detecting channels of a host to which hard disk controllers belong of the present invention comprises the following steps. A. The host sends an idle command to all of the hard disks to let them idle; B. The host performs read/write actions to the hard disk connected to channel 1 to let the hard disk generate a current variation; C. The current variation is transformed into a voltage signal sent to the enclosure-controller, which compares variation of the voltage signal when the hard disk idles and operates to obtain a flag; D. The host reads the flag in the enclosure-controller, and builds the corresponding relation between channel 1 and the enclosure-controller according to the flag; and E. The host performs read/write actions to the hard disk connected to channel 2 and repeats the above Steps C and D until the corresponding relations between all of the channels of the host and enclosure-controllers are built.

The various objects and advantages of the present invention will be more readily understood from the following detailed description when read in conjunction with the appended drawing, in which:

DETAILED DESCRIPTION OF THE PREFERRED EMBODIMENTS

The present invention detects the current variations when hard disks idle and operate to let enclosure-controllers generate flags so that the host can build the corresponding relations between several channels and several enclosure-controllers of hard disks, thereby detecting the channels of the host to which the enclosure-controllers of the hard disks belong.

Figure 1:
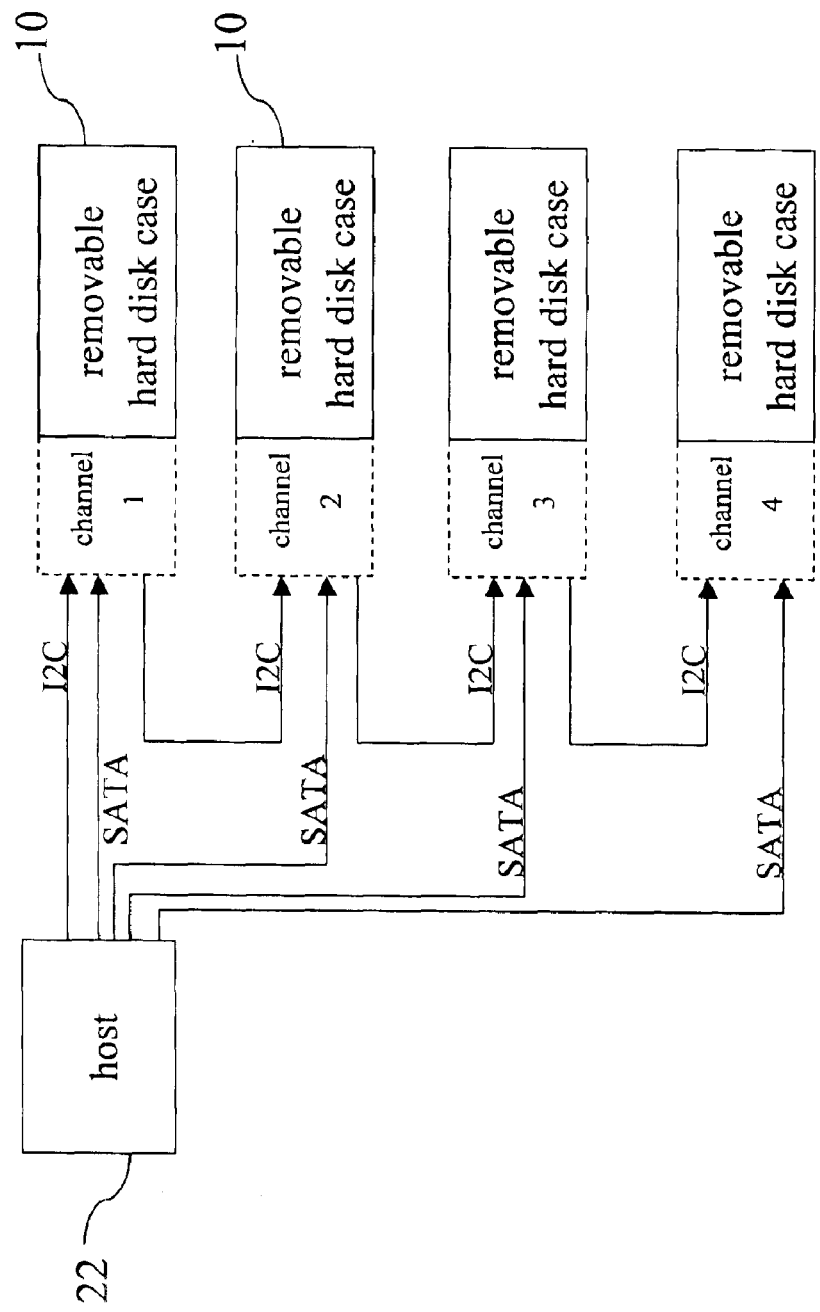
FIG. 1 is an architecture diagram of the hard disk device of the present invention.

As shown in FIG. 1, a hard disk device of the present invention comprises four removable hard disk cases 10. A host 22 has four serial ATA (SATA) channels, respectively being channel 1, channel 2, channel 3 and channel 4. The host 22 is connected to hard disks in the four removable hard disk cases 10 via these four SATA channels. Enclosure-controllers in the removable hard disk cases are connected to the host 22 not via the above channels but via the I2C serial bus.

Each device connected to the I2C serial bus needs to have a unique address to avoid conflict with other devices. Therefore, it is necessary to discriminate the I2C address to which each of the removable hard disk cases 10 belongs. This I2C address is called an ID hereinafter.

Figure 2:
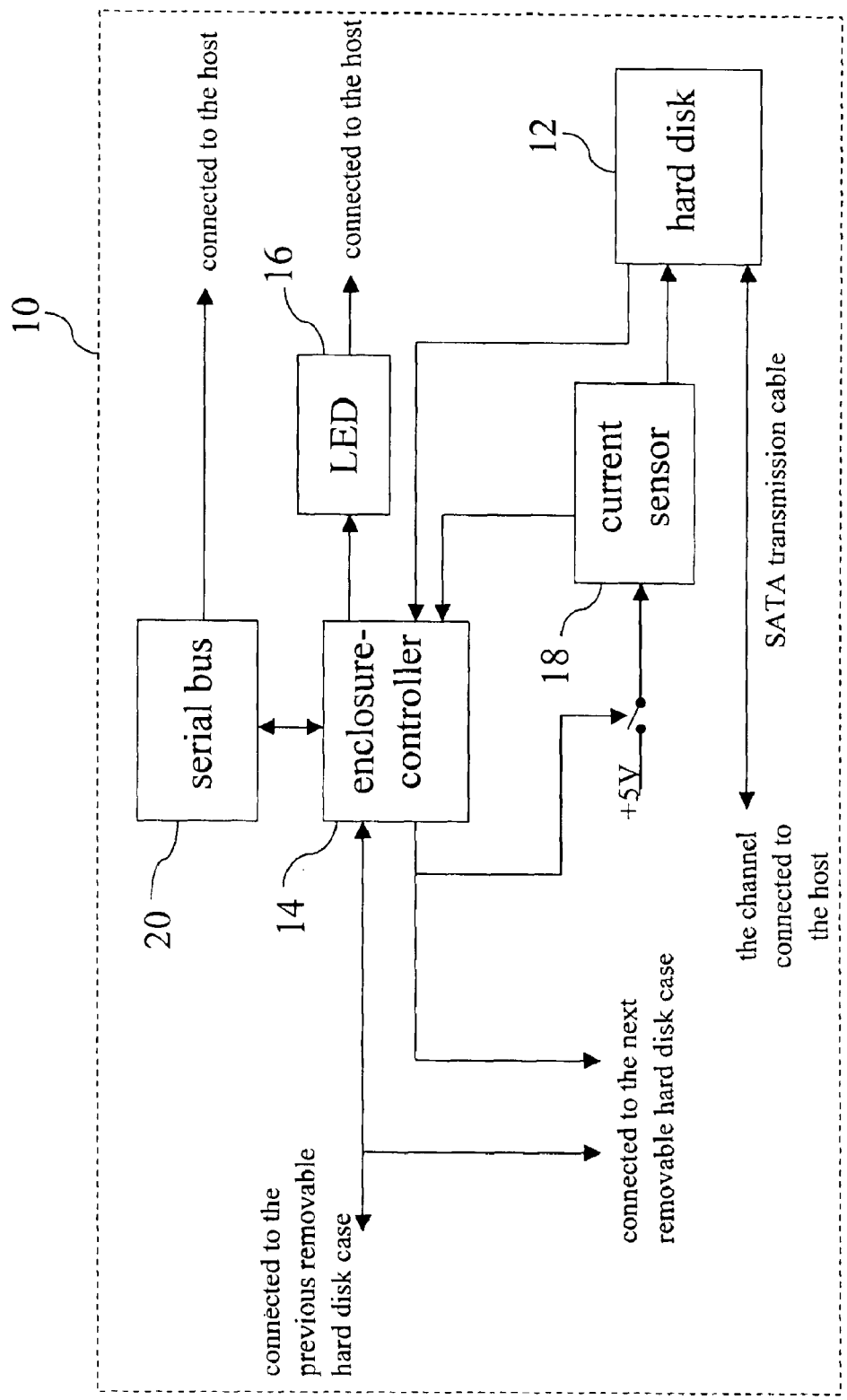
FIG. 2 is a structure block diagram of each removable hard disk case of the hard disk device of the present invention.

As shown in FIG. 2, the removable hard disk case 10 comprises a hard disk 12 and its read/write head (not shown) for data storage. The hard disk 2 is connected to a channel of the host via an SATA cable. The hard disk 12 is connected with a enclosure-controller 14, which has an ID and is used to collect environmental parameters like temperature, voltage and indication lights. The enclosure-controller 14 is also used to accomplish interactive relation of information transmission with the host. The enclosure-controller 14 is connected to an indication lamp, usually being an LED lamp 16. When the host finds that the hard disk malfunctions, it will notify the enclosure-controller 14 to control the LED lamp to flash for alarm. A current sensor 18 is provided between the hard disk 12 and the enclosure-controller 14, and is used to detect the current variation of the hard disk 12, transform the variation into a voltage signal and transmit the voltage signal to the enclosure-controller 14. The enclosure-controller 14 then compares the voltage signal with a voltage threshold to generate a flag. A serial bus 20 is connected to the enclosure-controller 14, and is also connected to the host for processing communication protocols and data transmission of connection interface. The host can thus accomplish interaction of data transmission with the enclosure-controller 14 via the serial bus 20 to read the flag triggered by the enclosure-controller 14 and build the corresponding relation between the channel connected to the hard disk 12 and the enclosure-controller 14 based on the flag.

Because the removable hard disk case 10 makes use of a simple architecture to detect channels of a host to which hard disk controllers belong, the removable hard disk case 10 of the present invention has the advantage of a cheap price.

Figure 3:
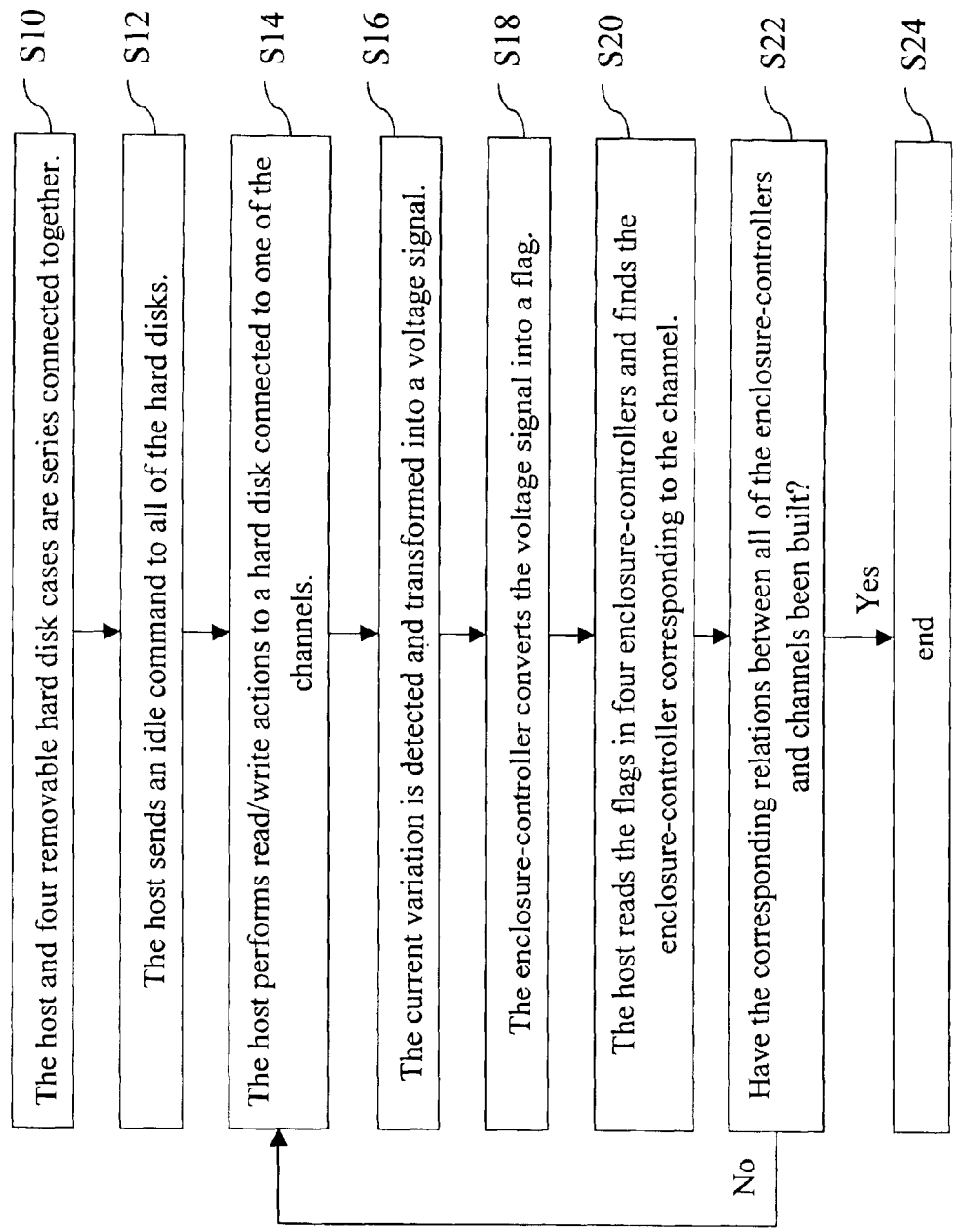
FIG. 3 is a flowchart of building the corresponding relations between channels of a host and enclosure-controllers of the present invention.

FIG. 3 is a flowchart of building the corresponding relations of channels of a host and enclosure-controllers of the present invention. As shown in FIG. 3, first, the host 22 and the four removable hard disk cases 10 are series connected together (Step S10). The host 22 is series connected with the four enclosure-controllers 14 via an I2C serial bus, and the channels of the host 22 and the hard disks 12 are randomly connected. Next, the host 22 sends an idle command to all the hard disks 12 to let them idle (Step S12). The host 22 then performs read/write actions to the hard disk 12 connected to channel 1 to let the hard disk 12 generate current variation (Step S14). The current sensor 18 connected to the hard disk 12 detects the current variation, transforms the variation into a voltage signal and transmits the voltage signal to the enclosure-controller 14 connected therewith (Step S16). The enclosure-controller 14 compares the voltage signal variation when the hard disk 12 idles and operates and converts the variation into a flag (Step S18).

Subsequently, the host 22 reads the flag in the four enclosure-controllers 14 to build the corresponding relation between channel 1 and one of the enclosure-controllers based on the flag. (Step S20). For instance, when the flag in one of the enclosure-controllers 14 is read to be 1, meaning that the ID of the enclosure-controller 14 corresponds to channel 1. Next, whether the corresponding relations between all the enclosure-controllers 14 and channels have been built is determined (Step S22). If the answer is yes, the whole process of building the corresponding relation is stopped (Step S24); otherwise, Step S14 is continued, and the host 22 performs read/write actions to the hard disk 12 connected to channel 2 to let the hard disk 12 generate current variation. The above Steps S14 to S20 are repeated until the corresponding relations between the channels of the host 22 and all the enclosure-controllers 13 are built.

After the corresponding relations of the channels of the host and the enclosure-controllers have been built, when the host 22 finds that one of the hard disks 12 malfunctions via the serial bus 20, it can immediately know the enclosure-controller 14 to which the abnormal hard disk 12 belongs through the previously built corresponding relations between the channels and the enclosure-controllers 14, and can immediately notify the enclosure-controller 14 to issue a command to let the LED lamp 16 connected therewith flash, hence informing the user to replace the hard disk 12.

When the host 22 issues a read/write command to the hard disk 12 of each of the removable hard disk cases 10 through software using the above method for setting an ID, the current sensor 18 stores the current variation of the hard disk in the enclosure-controller 14. The current variation is then read back by software via the I2C serial bus to perform a procedure corresponding to the ID. It is also feasible that the current variation of the hard disk 12 directly applies to the procedure of specifying the ID of each of the removable hard disk cases 10, thereby saving the step of using software for setting an ID. For instance, when the host 22 issues a read/write command to the hard disk 12 through software, the current variation of the hard disk 12 causes a corresponding pulse in the enclosure-controller 14. A counter in the enclosure-controller 14 counts the number of pulses due to current variation. If the command is issued to the first removable hard disk case 10 once, the value of the counter is 1, if the command is issued to the second removable hard disk case 10 twice, the value of the counter is 2, and so on. Software can change the value of the counter in each of the enclosure-controllers 14 from the number of times the command is issued to each of the removable hard disk case 10. The IDs can thus be set to let the value of each counter correspond to an ID, hence finishing specification of ID of each of the removable hard disk cases 10.

To sum up, in the present invention, a current sensor is used to detect the current variation when a hard disk idles and operates. The current variation is transformed into a voltage signal sent to a enclosure-controller. The enclosure-controller then converts the voltage signal into a flag. The host reads this flag via a serial bus to build the corresponding relations between several channels of a host and enclosure-controllers of several hard disks, thereby solving the problems of incorrect flashing light and incorrect removal of hard disk in the prior art due to ignorance of the relation between channels and enclosure-controllers. Moreover, the method of the present invention abandons manual assignment of IDs of enclosure-controllers of hard disks in the prior art, hence accomplishing the effects of easy use and friendly operation.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

What is claimed is:

1. A method for detecting channels of a channel to which hard disk controllers belong, said method detecting the corresponding relations between a plurality of channels of a host and a plurality of enclosure-controllers connected with hard disks, said method comprising the steps of:

A. said host sending an idle command to all of said hard disks to let them idle;
   B. said host performing read/write actions to said hard disk connected to channel 1 to let said hard disk generate a current variation;
   C. transforming the current variation into a voltage signal sent to said enclosure-controller, which compares variation of the voltage signal when said hard disk idles and operates to obtain a flag;
   D. said host reading said flag in said enclosure-controllers and building the corresponding relation between said channel 1 and one of said enclosure-controllers according to said flag; and
   E. said host performing read/write actions to said hard disk connected to channel 2, repeating said Steps C and D until the corresponding relations between all of said channels of said host and said enclosure-controllers are built.

2. The method as claimed in claim 1, wherein said host is series connected to said enclosure-controllers via a serial bus and said channels of said host and said hard disks are connected at random before said Step A.

3. The method as claimed in claim 1, wherein each of said enclosure-controllers has an ID, and said host makes use of software to read said flags in said enclosure-controllers via a bus and then build the corresponding relation between said channel 1 and said ID of one of said enclosure controllers according to said flag in said Step D.

4. The method as claimed in claim 1, wherein a current sensor connected to each of said enclosure-controllers is used to detect the current variation and transform the current variation into said voltage signal in said Step C.

* * * * *